(12) United States Patent
Vo

(10) Patent No.: US 10,378,551 B2
(45) Date of Patent: Aug. 13, 2019

(54) COUNTER-ROTATING COMPRESSOR

(71) Applicant: Huu Duc Vo, Montreal (CA)

(72) Inventor: Huu Duc Vo, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 808 days.

(21) Appl. No.: 14/851,680

(22) Filed: Sep. 11, 2015

(65) Prior Publication Data

US 2017/0074280 A1 Mar. 16, 2017

(51) Int. Cl.
| | |
|---|---|
| F04D 29/28 | (2006.01) |
| F02C 3/04 | (2006.01) |
| F04D 17/02 | (2006.01) |
| F04D 29/44 | (2006.01) |
| F02C 3/067 | (2006.01) |
| F02C 3/08 | (2006.01) |
| F04D 17/00 | (2006.01) |

(52) U.S. Cl.
CPC ............ F04D 29/286 (2013.01); F02C 3/04 (2013.01); F04D 17/02 (2013.01); F04D 29/442 (2013.01)

(58) Field of Classification Search
CPC .. F23R 3/04; F23R 3/12; F04D 29/444; F04D 29/286; F04D 29/442; F04D 17/00; F04D 17/025; F02C 3/04; F02C 3/067; F02C 3/08
See application file for complete search history.

(56) References Cited

U.S. PATENT DOCUMENTS

| | | | | |
|---|---|---|---|---|
| 2,344,366 | A | | 3/1944 | Price |
| 2,563,270 | A | * | 8/1951 | Price ........................ F02C 3/067 236/93 A |
| 2,648,492 | A | * | 8/1953 | Stalker ...................... F02C 3/00 415/110 |
| 2,648,493 | A | * | 8/1953 | Stalker .................... F04D 21/00 415/110 |
| 2,853,227 | A | * | 9/1958 | Beardsley ............. F04D 17/127 415/122.1 |
| 3,269,111 | A | * | 8/1966 | Brill ........................ B63H 11/08 415/122.1 |

(Continued)

FOREIGN PATENT DOCUMENTS

| | | | | |
|---|---|---|---|---|
| CA | 2526591 A1 | * | 2/2005 | ............. F01D 5/187 |
| WO | WO 2013141912 | * | 9/2013 | ............. H04M 9/08 |

OTHER PUBLICATIONS

"A study of speed ratio affecting the performance of a contra-rotating axial compressor"-Chen et al (Published Jul. 2008).*

*Primary Examiner* — Jason D Shanske
*Assistant Examiner* — Jessica L Kebea
(74) *Attorney, Agent, or Firm* — Norton Rose Fulbright Canada LLP

(57) ABSTRACT

A compressor is described which includes a non-axial first rotor, and a second rotor disposed immediately downstream from the first rotor and being co-axial therewith about a longitudinal axis of rotation. The second rotor rotates in a direction opposite the non-axial first rotor to discharge fluid flow into an uninterrupted passage between an outlet of the second rotor and one of a downstream combustor or a further compression stage. The uninterrupted passage is free of a diffusing passage. A gas turbine engine including such a compressor and a method of compressing fluid flow is also described.

20 Claims, 4 Drawing Sheets

(56) References Cited

U.S. PATENT DOCUMENTS

| | | | |
|---|---|---|---|
| 4,428,715 A | | 1/1984 | Wiggins |
| 4,455,121 A | * | 6/1984 | Jen ............................ F01D 9/00 |
| | | | 415/143 |
| 5,003,766 A | * | 4/1991 | Paul ........................ F01D 5/18 |
| | | | 415/114 |
| 5,634,831 A | * | 6/1997 | Davies .................... B63H 5/10 |
| | | | 440/47 |
| 6,488,469 B1 | * | 12/2002 | Youssef .................... F02C 3/08 |
| | | | 415/143 |
| 6,589,013 B2 | | 7/2003 | Abdallah |
| 9,097,258 B2 | | 8/2015 | Hofer et al. |
| 2002/0119038 A1 | * | 8/2002 | Abdallah .............. F04D 17/127 |
| | | | 415/1 |
| 2004/0025490 A1 | * | 2/2004 | Paul .................... B64C 29/0075 |
| | | | 60/39.43 |
| 2016/0245159 A1 | * | 8/2016 | Kemmerling ........... F02B 37/24 |

\* cited by examiner

COUNTER-ROTATING COMPRESSOR

TECHNICAL FIELD

The application relates generally to compressors and, more particularly, to a compressor having counter-rotating rotors.

BACKGROUND

Centrifugal compressors in some gas compression systems require diffusers to convert the gas accelerated by the impeller of the centrifugal compressor into pressure energy, and to reorient the gas so that it flows parallel to the longitudinal center axis of the compressor for passage downstream. Mixed-flow compressor stages have a downstream stator that orients the discharge from a mixed-flow rotor so that it is parallel to the center axis. Reorienting the gas flow imposes relatively high flow turning or diffusion, and thus results in aerodynamic losses which affect the overall efficiency of the compressor. Because compressor diffusers, such as diffuser pipes downstream of an impeller for example, take up considerable space it would be desirable to obviate the need for such diffusers entirely. It would also be desirable to increase the pressure ratio of the compressor relative to standard impeller-diffuser pipe configurations.

SUMMARY

In one aspect, there is provided a compressor comprising: a non-axial first rotor; and a second rotor disposed immediately downstream from the first rotor and being co-axial therewith about a longitudinal axis of rotation, the second rotor rotating in a direction opposite the non-axial first rotor to discharge fluid flow into an uninterrupted passage between an outlet of the second rotor and one of a downstream combustor or a further compression stage, the uninterrupted passage being free of a diffusing passage.

In another aspect, there is provided a gas turbine engine comprising a compressor having a non-axial first rotor, and a second rotor disposed immediately downstream from the first rotor and being co-axial therewith about a longitudinal axis of rotation, the second rotor rotating in a direction opposite the non-axial first rotor to discharge fluid flow into an uninterrupted passage between an outlet of the second rotor and one of a downstream combustion chamber or compression stage, the uninterrupted passage being free of a diffusing passage.

In yet another aspect, there is provided a method of compressing fluid flow, comprising: rotating a non-axial first rotor; and rotating a second rotor in a direction opposite the non-axial first rotor, the second rotor being located immediately downstream of the non-axial first rotor, the counter-rotating second rotor discharging fluid flow into an uninterrupted passage downstream thereof being free of a diffusing passage.

BRIEF DESCRIPTION OF THE DRAWINGS

Reference is now made to the accompanying figures in which.

DETAILED DESCRIPTION

Figure 1:
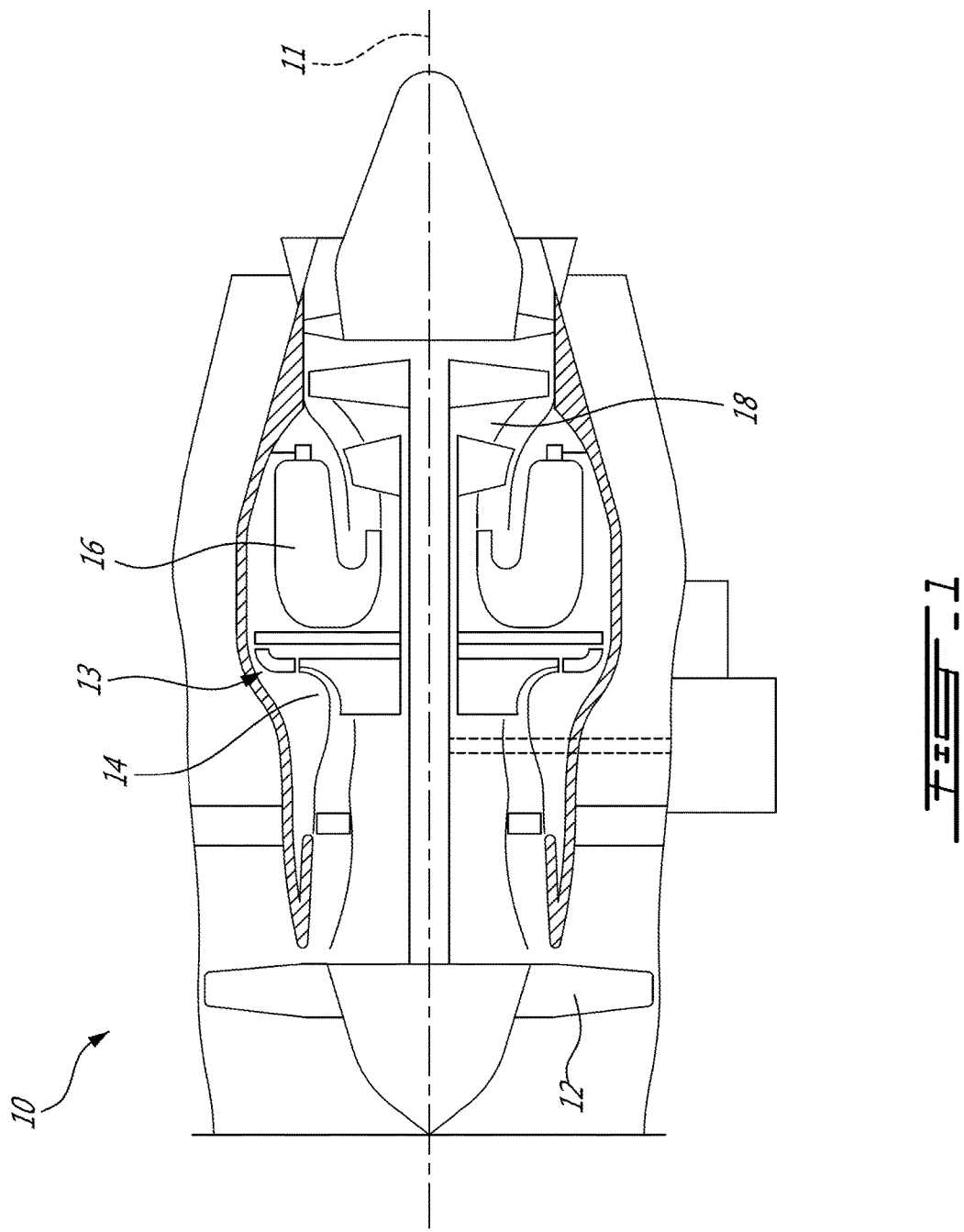
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 13 for pressurizing the air, a combustor 16 in which the compressed air is mixed with fuel and ignited for generating an annular stream of hot combustion gases, and a turbine section 18 for extracting energy from the combustion gases. The compressor section 13 includes a counter-rotating compressor 14 having two rotors which rotate in opposite directions to each other. The rotors of the compressor 14 rotate about a longitudinal centerline axis 11 of the gas turbine engine 10.

Although shown and described herein as being a component of the gas turbine engine 10, the compressor 14 can be used with other turbo machinery. For example, the compressor 14 can be a component of a turbocharger or a supercharger in an internal combustion engine. The compressor 14 is disclosed herein with respect to a gas turbine engine 10 and its components for the sole purpose of describing the features of the compressor 14 and its operation, and does not limit the application of the compressor 14 only to gas turbine engines 10. It will be appreciated that other turbo machinery applications are within the scope of the present disclosure.

As will be seen, the compressor 14 includes counter-rotating compressor rotors, at least the first upstream one of which is a non-axial compressor rotor. The second, downstream, rotor enables the removal of, or rather obviates the need for, a diffuser (such as diffuser pipes, stators, etc.) located downstream of the compressor rotor(s). The two, counter-rotating, compressor rotors may also help to orient the flow of the compressed fluid to be in an axial direction. In so doing, the compressor 14 allow for components of conventional non-axial compressor stages, such as diffuser pipes or stators, to be removed from the gas turbine engine 10.

Figure 2:
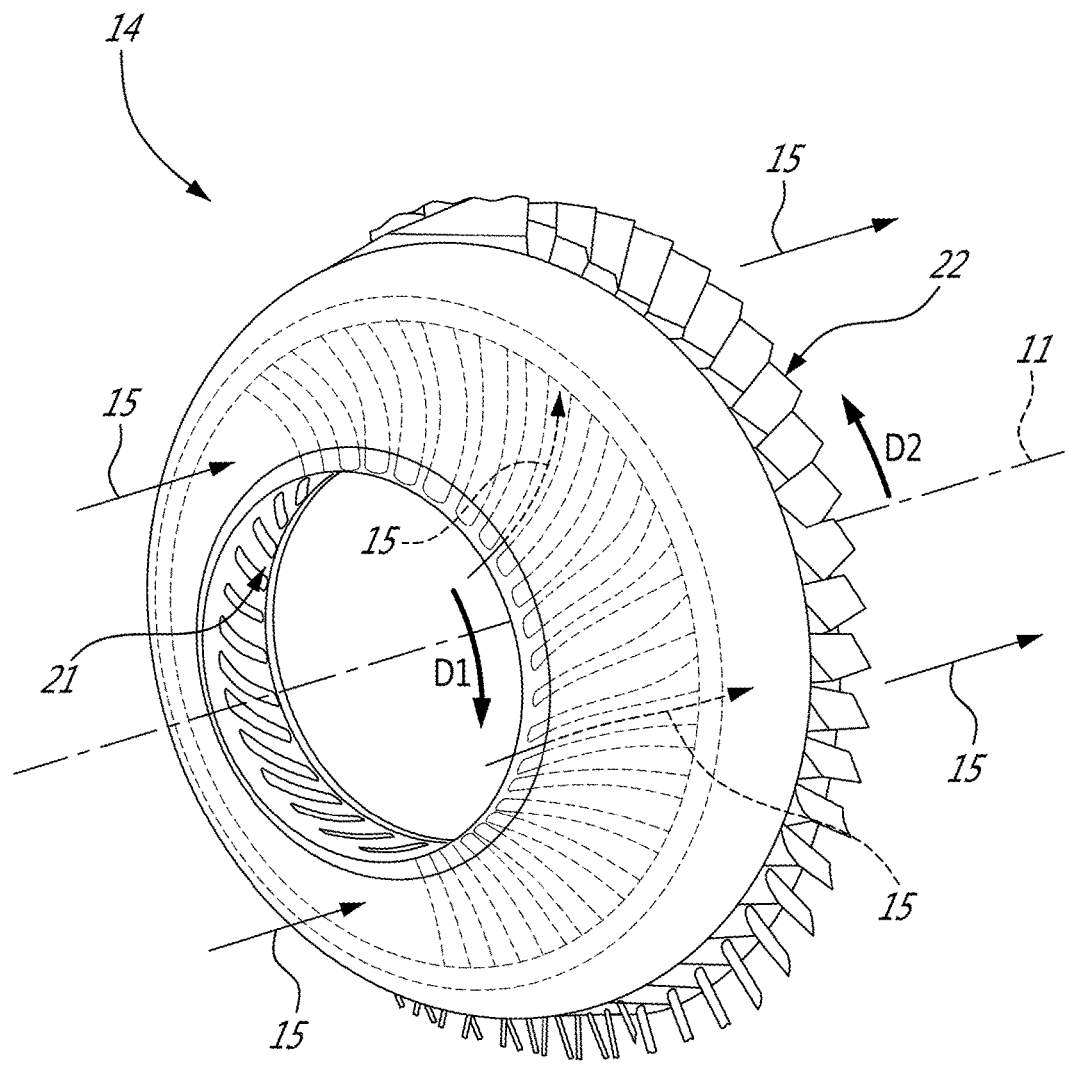
FIG. 2 is a perspective view of a compressor, according to an embodiment of the present disclosure.

Referring to FIG. 2, the compressor 14 has a non-axial first rotor 21 and a co-axial second rotor 22 located immediately downstream from the non-axial first rotor 21. The first and second rotors 21,22 work together to compress a fluid flow 15 which enters the first-rotor 21 via a compressor inlet, and which is discharged from the second rotor 22 at a higher pressure via a compressor outlet. The compressor 14 may only have the first and second rotors 21,22, or these rotors 21,22 may be part of a multi-rotor compressor section 13.

Both the first and second rotors 21,22 rotate about the longitudinal axis 11 in opposite directions in order to compress the fluid flow 15. The rotating first and second rotors 21,22 draw a working fluid such as gas or liquid into the compressor 14 via an inlet thereof, impart work into the working fluid flow 15, and discharge it via an outlet of the compressor 14 to another downstream component, such as the combustor of the gas turbine engine or another compressor stage. The first rotor 21 rotates in a first direction D1 while the second rotor 22 rotates in a second direction D2, the second direction D2 being opposite to the first direction D1. The compressor 14 is therefore referred to as a "counter-rotating" compressor 14.

The term "non-axial" is understood in the art, and when used to describe the first rotor 21 refers to the directional vector of the fluid flow 15 as it is discharged from the first rotor 21. An "axial" rotor is one where the fluid flow entering and leaving the rotor is parallel to the axis of rotation of the rotor (i.e. the longitudinal centerline axis 11), when viewed from the meridional perspective. This is referred to herein as the axial direction.

The first rotor 21 is a non-axial rotor, such as an impeller of a centrifugal compressor 14 or a mixed-flow rotor of a mixed-flow compressor 14. An impeller is a rotor in which the fluid flow enters parallel to the axis of rotation but is discharged substantially perpendicularly to the axis of rotation, i.e. along a radial direction, again when viewed from the meridional perspective. A mixed-flow compressor rotor is one in which the fluid flow enters parallel to the axis of rotation but is discharged by the mixed-flow compressor rotor to have both radial and axial flow velocity components. Stated differently, the discharge from a mixed-flow compressor rotor may have a non-zero radial flow velocity component.

In most embodiments, but not necessary all, the second rotor 22 is an axial rotor. The second rotor 22 may however also be of the non-axial type, provided that it is capable of discharging the fluid flow 15 along the axial direction. The second rotor 22 is located immediately downstream of the first rotor 21. The term "immediately downstream" refers to the second rotor 22 being located in close proximity to the exit of the first rotor 21 such that the fluid flow 15 is discharged from the first rotor 21 and directly enters the second rotor 22. There may be no rotating or static component between the discharge of the first rotor 21 and the intake of the second rotor 22.

This positioning of the downstream second rotor 22 can take different forms. For example, the second rotor 22 can be axially spaced from the first rotor 21 immediately downstream therefrom. The second rotor 22 may instead surround the first rotor 21, such that it is radially spaced apart from the first rotor 21 immediately downstream therefrom. As will be described in greater detail below, a relatively small annular gap may separate the second rotor 22 from the exit of the first rotor 21.

Figure 3:
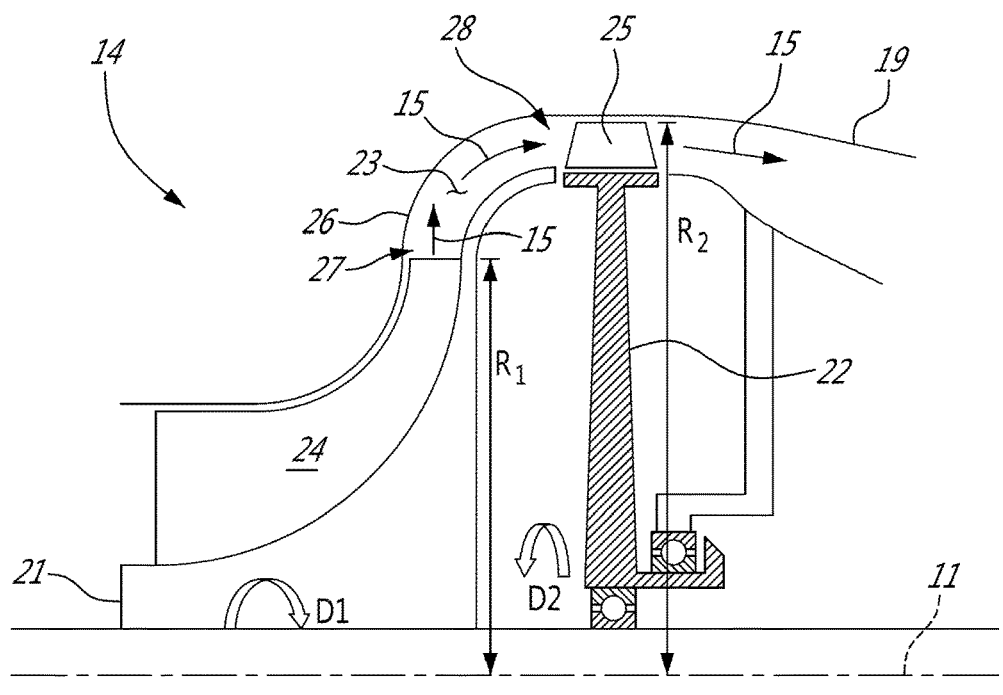
FIG. 3 is a partial cross-sectional view of the compressor of FIG. 2.

Referring to FIG. 3, the second rotor 22 engages the fluid flow 15 at the exit of the first rotor 21 and discharges the fluid flow into an uninterrupted passage 19. The uninterrupted passage 19 is a space or volume of the engine which extends from the outlet of the second rotor 22 to the inlet of another engine component which is downstream from the second rotor 22, such as a combustion chamber or separate compression stage. The second rotor 22 imparts work (i.e. increases the pressure) to the fluid flow, and thus eliminates the need for a conventional diffusing device. The uninterrupted passage 19 therefore does not have a diffusing passage. A "diffusing passage" is understood herein to be a conduit or volume which increases in cross-sectional area along its length between an inlet and an outlet in order to convert the fluid flow accelerated by the rotor into pressure energy. One example of a diffusing passage is the interior of a diffusing pipe. Another example of a diffusing passage is found in the diffusing space between the vanes of a compressor stator. It can thus be appreciated that the second rotor 22 is a "diffuser-replacing" rotor 22.

The second rotor 22 may also turn the fluid flow 15 so as to discharge it in a substantially axial direction. It is understood that the fluid flow 15 discharged from a non-axial rotor such as an impeller or a mixed-flow compressor rotor, for example, will have three directional flow components: a radial direction flow component that is perpendicular to the axis of rotation of the rotor (i.e. the longitudinal axis 11), an axial direction flow component that is parallel to the axis of rotation, and a circumferential or "swirl" direction flow component.

The use of "turn" and its equivalents herein therefore refers to the ability of the second rotor 22 to change or modify the flow path of the fluid flow 15 such that it exits the second rotor 22, and thus enters the, substantially in the axial direction. More particularly, the compressor 14 helps to reduce or substantially eliminate both the radial and circumferential direction flow components from the fluid flow 15, such that substantially all that remains at the outlet of the compressor 14 is the axial direction flow component. It will be appreciated that the fluid flow 15 discharged from the second rotor 22, and thus from the compressor 14, may still have relatively minor radial and circumferential direction flow components, but that the magnitude of these flow components is small when compared to that of the axial direction flow component.

One possible approach for reducing or eliminating the radial direction flow component is shown in FIG. 3. An annular gap 23 is defined downstream of the first rotor 21, between an outlet of its first rotor blades 24 and the inlet of the second rotor blades 25 of the second rotor 22. The annular gap 23 may be a vane-less space. The fluid flow 15 is discharged by the first rotor blades 24 into the annular gap 23. The annular gap 23 may include, or define, a curved fluid conduit 26. The fluid conduit 26 can be an enclosed annular fluid body that is defined by a separate structure, or which is formed from the profile of the compressor shroud or casing.

The fluid conduit 26 extends between a first end 27 located at the outlet of the first rotor blades 24 and a second end 28 located at the inlet of the second rotor blades 25. The fluid conduit 26 has a curvature which operates to bend or turn the fluid flow 15 discharged by the first rotor 21 before it is engaged by the second rotor 22. More particularly, the fluid conduit 26 turns the fluid flow 15 between the first end 27, where it may have a significant radial direction flow component in the case of an impeller first rotor 21, and the second end 28 where the radial direction flow component has been reduced or eliminated before the fluid flow 15 is engaged by the second rotor blades 25.

Figure 4:
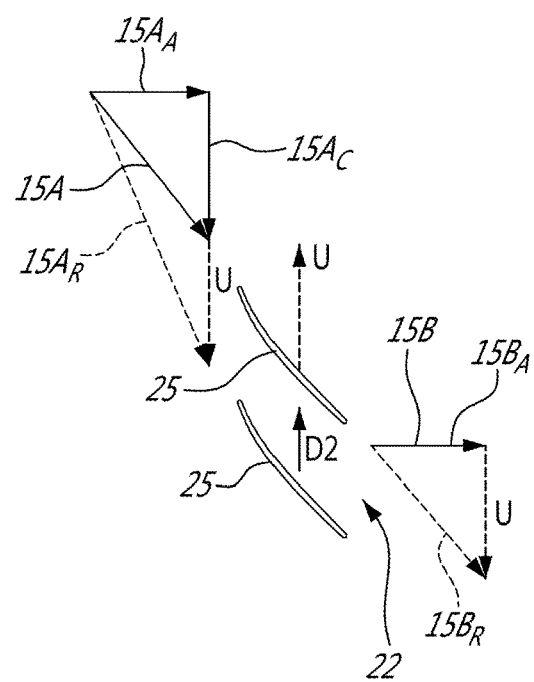
FIG. 4 is a velocity vector diagram for the compressor of FIG. 2.

Even after reduction or elimination of the radial direction flow component, the fluid flow 15 exiting the fluid conduit 26 may still have a circumferential direction flow component. This flow component is reduced or eliminated by the second rotor blades 25 of the second rotor 22, as is more clearly understood from the velocity vector diagrams of FIG. 4.

The second rotor blades 25 engage the upstream fluid flow 15A which has a circumferential velocity flow component $15A_C$ and an axial velocity flow component $15A_A$. The second rotor blades 25 rotate in direction D2 and have an angular velocity which can be converted into rotor blade circumferential velocity U. The rotor blade circumferential velocity U is opposite in direction to the circumferential velocity flow component $15A_C$ of the upstream fluid flow 15A. In the rotating frame of reference of the second rotor 22, the upstream fluid flow 15A appears as relative fluid flow $15A_R$ from the addition of the rotor blade circumferential velocity U. Due to their rotation, the second rotor blades 25 only need to turn the flow slightly so that it exits at a downstream fluid flow $15B_R$ relative to the second rotor 22. If the magnitude of the circumferential velocity flow component of downstream fluid flow $15B_R$ is equal to the magnitude of the rotor blade circumferential velocity U, they will cancel each other out, thereby resulting in a downstream fluid flow 15B which is made up primarily of an axial velocity flow component $15B_A$. It can therefore be appreciated that the rotation of the second rotor 22 and its second rotor blades 25 helps to reduce or eliminate the circumferential direction flow component of the fluid flow 15, leaving the fluid flow 15 having a primarily axial direction flow component.

Figure 5:
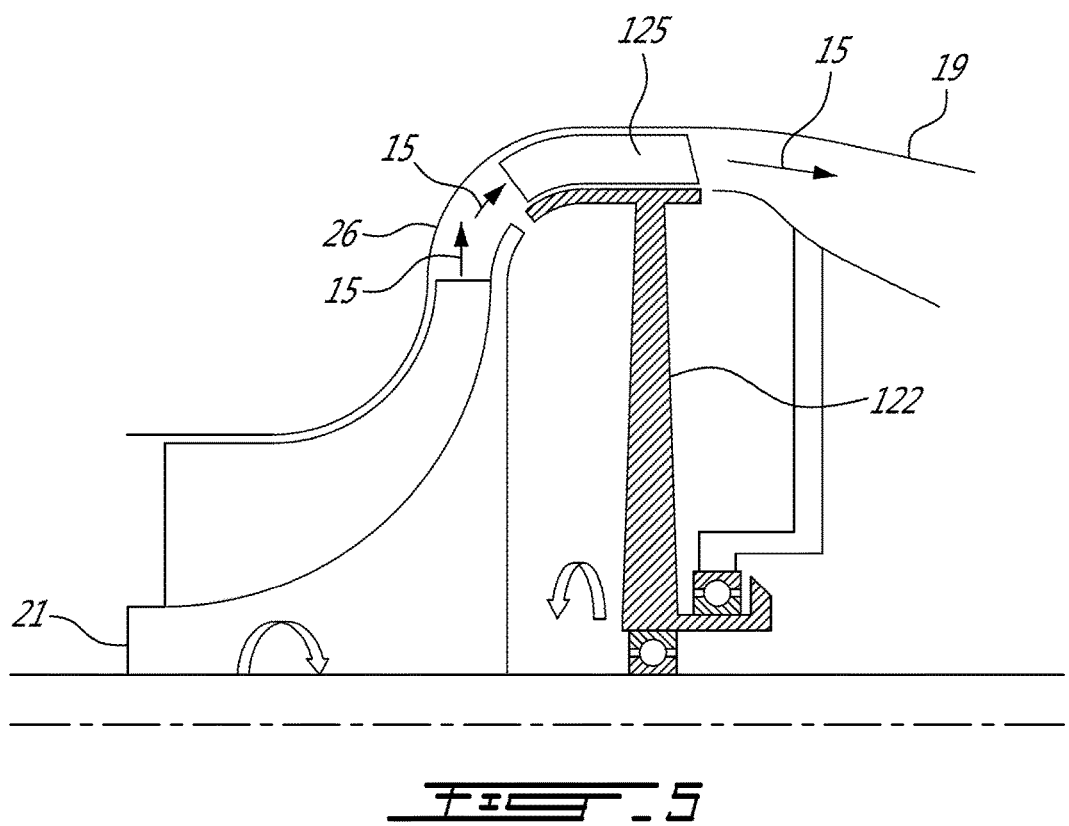
FIG. 5 is a partial cross-sectional view of a compressor according to another embodiment of the present disclosure.

FIG. 5 shows another embodiment of the second rotor 122. The shape of each of the second rotor blades 125 can be different from that shown in FIG. 3. For example, each of the second rotor blades 125 can extend into the fluid conduit 26 to engage the fluid flow 15 within the fluid conduit 26. Each of the second rotor blades 125 may therefore extend into the vane-less space between the exit of the first rotor 21 and the inlet of the second rotor 122. It will be appreciated that the shape the second rotor blades 125 which extend into the fluid conduit 26 can vary, and is not limited to the shape shown in FIG. 5.

In some conventional non-axial compressors, such as a centrifugal compressor employing an impeller, the reduction or elimination of the radial and circumferential direction flow components is achieved with a diffuser, having for example "fish-tail" diffuser pipes. This involves a significant amount of flow turning, which can generate important losses and reduce the overall efficiency of the compressor. A compressor stator positioned downstream of a mixed-flow compressor rotor may also experience these losses.

In contrast, the compressor 14 and second rotor 22 disclosed herein contribute to reducing or eliminating the radial and circumferential direction flow without incurring high flow turning and thus high aerodynamic losses, which may improve the overall efficiency of the compressor 14. It is therefore possible, in an embodiment, to have a compressor 14 and an impeller first rotor 21 that is free of one or more diffuser pipes, as these are no longer required to turn the fluid flow 15 and increase the pressure of the fluid flow 15. It is also possible, in another embodiment, to have a compressor 14 and a mixed-flow first rotor 21 that is free of a downstream stator because the stator is no longer required to guide the fluid flow 15 or increase its pressure.

The second rotor 22 may also increase the pressure ratio of the compressor 14, when compared to a conventional centrifugal or mixed-flow compressor without a second rotor, because the rotating second rotor 22 and second rotor blades 25 impart additional work (i.e. pressure energy) into the fluid flow 15. This may occur, for example, if the second rotor 22 is rotating at a rotational speed which is equal to or greater than the rotational speed of the first rotor 21. In such a configuration, it has been estimated that the second rotor 22 may double the work of an impeller first rotor 21. In other embodiments, the second rotor 22 is rotated at a lower rotational speed than that of the first rotor 21. This may be desirable, for example, in situations where high speed flows are exiting the first rotor 21. It may be desirable to reduce the rotational speed of the second rotor 22 to below that of the first rotor 21 to limit shock losses in the second rotor 22.

The first rotor 21 may also define a first radius $R_1$, which is measured between the radially outer edge or blade tips of the non-axial first rotor 21 and the longitudinal axis of rotation 11, and the second rotor 22 may define a second radius $R_2$ between its outer edge or blade tips and the same longitudinal axis of rotation 11. In one particular embodiment, the first radius $R_1$ is less than the second radius $R_2$. This may be the case, for example, where the first rotor 21 is an impeller and the second rotor 22 is an axial rotor.

In light of this potential increase in pressure ratio, it can be appreciated that a gas turbine engine 10 can have the compressor 14 disclosed herein. Since the compressor 14 may increase the work performed by a conventional centrifugal or mixed-flow compressor, the gas turbine engine 10 may only need to have one compressor 14. Stated differently, the potential increase in pressure provided by the compressor 14 disclosed herein may make other compression stages redundant, thereby allowing for their removal from the gas turbine engine 10. The removal of other compression stages may reduce the overall weight and length of the gas turbine engine, and also reduce the parts count.

The gas turbine engine 10 having the compressor 14 disclosed herein also allows for the elimination of the diffuser of a centrifugal compressor stage, or the elimination of the stator of a mixed-flow compressor stage, with a counter-rotating second rotor 22 that turns the fluid flow 15 back to the axial direction with a lower diffusion factor and aerodynamic losses than a conventional diffuser or stator, while providing the equivalent in work of a separate compression stage. Since the diffusion factor in the counter-rotating second rotor 22 may be lower than that of the diffuser or stator that it replaces, the aerodynamic losses may be less making the adiabatic efficiency of the compressor 14 potentially higher than a conventional non-axial stage even with the potential greater pressure ratio of the compressor 14.

There is also disclosed a method of compressing a fluid flow 15. The method includes rotating a non-axial first rotor 21 in a first direction to compress the fluid flow 15. The fluid flow 15 discharged from the first rotor 21 can be in substantially radial direction, or in a combined radial and axial direction. The method may also include reducing the radial direction flow component from the fluid flow 15 at the discharge of the first rotor 21, such as with the fluid conduit 26 described above.

The method also includes counter-rotating the second rotor 22 immediately downstream of the non-axial first rotor 21, which involves rotating the second rotor 22 in a second direction opposite to the first direction to further compress the fluid flow 15. The counter-rotating second rotor discharges the fluid flow 15 into the uninterrupted passage 19, which is free of a diffusing passage.

The rotation of the second rotor 22 may reduce or eliminate the circumferential direction flow component from the fluid flow 15. The fluid flow 15 discharged by the first rotor blades 24 can be engaged by the second rotor 22. The method also includes turning the fluid flow 15 discharged by the non-axial first rotor 21 with the second rotor 22 to discharge the fluid flow 15 from the second rotor 22 in a substantially axial direction.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A compressor comprising: a non-axial first rotor; and a second rotor disposed immediately downstream from the first rotor and being co-axial therewith about a longitudinal axis of rotation, the second rotor rotating in a direction opposite the non-axial first rotor to discharge fluid flow immediately downstream of the second rotor in a substantially axial direction parallel to the longitudinal axis of rotation into an uninterrupted passage between an outlet of the second rotor and one of a downstream combustor or a further compression stage, the uninterrupted passage being free of a diffusing passage.

2. The compressor as defined in claim 1, comprising an annular gap between rotor blades of the non-axial first rotor and rotor blades of the second rotor.

3. The compressor as defined in claim 2, comprising a curved fluid conduit located in the annular gap, the curved fluid conduit turning fluid flow discharged from the rotor blades of the non-axial first rotor to reduce a radial direction flow component therefrom.

4. The compressor as defined in claim 3, wherein the curved fluid conduit extends between a first end at an outlet of the rotor blades of the non-axial first rotor and a second end at an inlet of the rotor blades of the second rotor.

5. The compressor as defined in claim 1, wherein rotation of the second rotor turns fluid flow discharged from the non-axial first rotor in the substantially axial direction.

6. The compressor as defined in claim 1, wherein the non-axial first rotor rotates about the longitudinal axis at a first rotational speed and the second rotor rotates about the longitudinal axis at a second rotational speed, the second rotational speed being equal to or greater than the first rotational speed.

7. The compressor as defined in claim 1, wherein radially outer tips of the non-axial first rotor define a first radius relative to the longitudinal axis of rotation, and radially outer tips of the second rotor define a second radius relative to the longitudinal axis of rotation, the first radius being less than the second radius.

8. The compressor as defined in claim 1, wherein the non-axial first rotor is an impeller and the second rotor is an axial rotor.

9. A gas turbine engine comprising a compressor having a non-axial first rotor, and a second rotor disposed immediately downstream from the first rotor and being co-axial therewith about a longitudinal axis of rotation, the second rotor rotating in a direction opposite the non-axial first rotor to discharge fluid flow immediately downstream of the second rotor in a substantially axial direction parallel to the longitudinal axis of rotation into an uninterrupted passage between an outlet of the second rotor and one of a downstream combustion chamber or compression stage, the uninterrupted passage being free of a diffusing passage.

10. The gas turbine engine as defined in claim 9, wherein rotation of the second rotor turns fluid flow discharged from the non-axial first rotor in the substantially axial direction.

11. The gas turbine engine as defined in claim 9, wherein the non-axial first rotor is an impeller and the uninterrupted passage is free of the diffusing passage defined by at least one diffuser pipe.

12. The gas turbine engine as defined in claim 9, wherein the non-axial first rotor is a mixed-flow compressor rotor and the uninterrupted passage is free of a compressor stator.

13. The gas turbine engine as defined in claim 9, wherein radially outer tips of the non-axial first rotor define a first radius relative to the longitudinal axis of rotation, and radially outer tips of the second rotor define a second radius relative to the longitudinal axis of rotation, the first radius being less than the second radius.

14. The gas turbine engine as defined in claim 9, wherein the non-axial first rotor rotates about the longitudinal axis at a first rotational speed and the second rotor rotates about the longitudinal axis at a second rotational speed, the second rotational speed being equal to or greater than the first rotational speed.

15. The gas turbine engine as defined in claim 9, wherein the non-axial first rotor is an impeller and the second rotor is an axial rotor.

16. A method of compressing fluid flow, comprising:
rotating a non-axial first rotor; and
rotating a second rotor in a direction opposite the non-axial first rotor, the second rotor being located immediately downstream of the non-axial first rotor, the second rotor discharging fluid flow immediately downstream of the second rotor in a substantially axial direction parallel to a longitudinal axis of rotation of the second rotor into an uninterrupted passage, the uninterrupted passage extending between an outlet of the second rotor and one of a downstream combustion chamber or compression stage and being free of a diffusing passage.

17. The method as defined in claim 16, wherein rotating the second rotor comprises reducing a circumferential direction flow component with the second rotor.

18. The method as defined in claim 16, wherein rotating the non-axial first rotor comprises discharging fluid flow in a radial direction from the non-axial first rotor, and reducing a radial direction flow component from fluid flow discharged from the non-axial first rotor before the second rotor.

19. The method as defined in claim 16, wherein rotating the non-axial first rotor comprises discharging fluid flow in a combined radial and axial direction from the non-axial first rotor, and reducing a radial direction flow component from fluid flow discharged from the non-axial first rotor before the second rotor.

20. The method as defined in claim 16, wherein counter-rotating the second rotor comprises turning fluid flow discharged from the non-axial first rotor in the substantially axial direction.

* * * * *